(No Model.)

J. H. LOUCH.
ILLUMINATED DECORATIVE SIGN.

No. 281,536. Patented July 17, 1883.

Witnesses:
Phil C. Dietrich
Arthur F. Powell

Inventor:
John H. Louch.
by: J. M. Alexander
Attorney.

UNITED STATES PATENT OFFICE.

JOHN H. LOUCH, OF CINCINNATI, OHIO.

ILLUMINATED DECORATIVE SIGN.

SPECIFICATION forming part of Letters Patent No. 281,536, dated July 17, 1883.

Application filed March 17, 1883. (No model.)

*To all whom it may concern:*

Be it known that I, JOHN H. LOUCH, of Cincinnati, in the county of Hamilton and State of Ohio, have invented certain new and useful Improvements in Illuminated Decorative Signs; and I do hereby declare that the following is a full, clear, and exact description thereof, reference being had to the accompanying drawings, and to the letters of reference marked thereon, which form part of this specification, in which—

Figure 1:
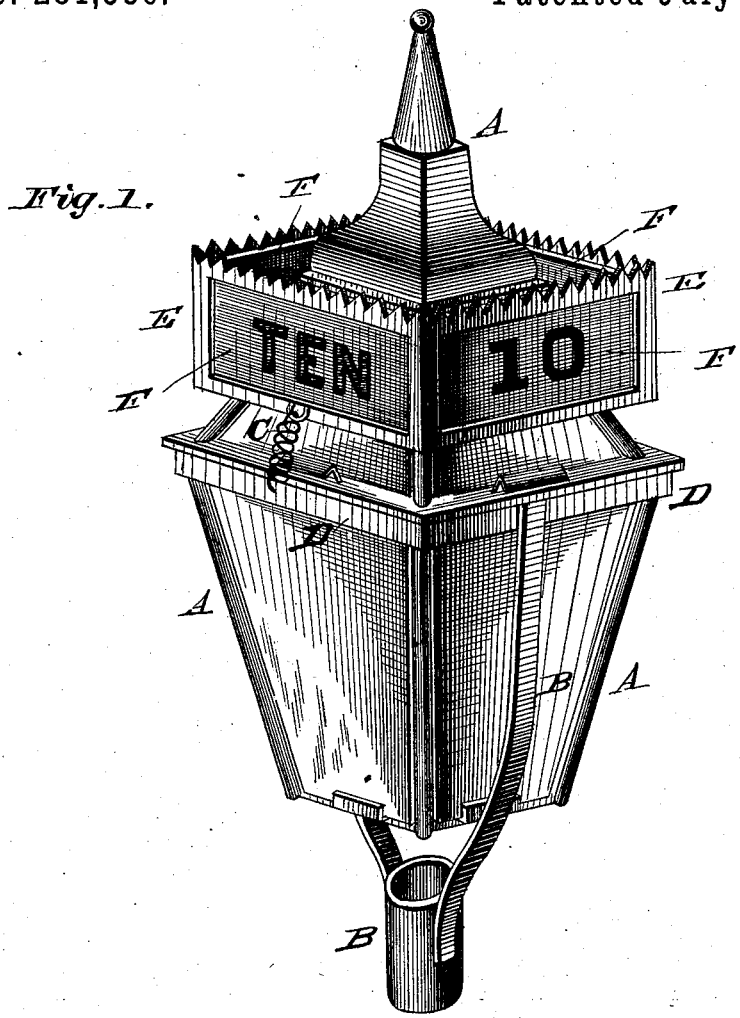
Figure 2:
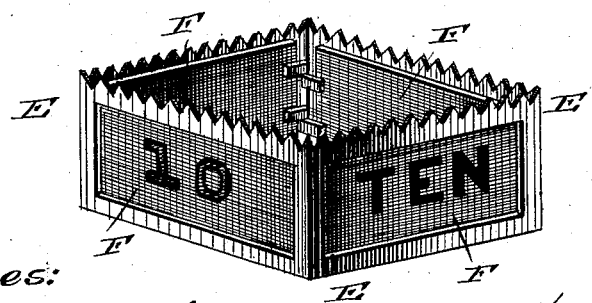

Figure 1 is a perspective view of a street-lamp, showing my improved luminous transparent plates in the frame applied to it. Fig. 2 is a perspective view of the luminous transparent plates in the frame detached from the lamp-frame.

Long prior to my invention compositions of paint having for their base phosphorus or its chemical equivalents have been used for producing luminosity on walls, skylights, and other objects.

The nature of my invention consists in a transparency-frame containing glass plates having translucent advertising-letters or other characters on them, which will be exposed to view at night without the aid of any other light than that which is afforded by the luminous properties of the compound with which the said plates are coated, and also in adapting such a frame for the well-known street-lamps, all of which will be fully understood from the following description and the drawings hereto annexed.

A designates the frame of a street-lamp; B, the support therefor, which is attached to the lamp part.

C C are springs for holding the frame having the luminous plates down on top of the lamp-frame.

D is the lamp-frame support.

E designates the frame of the luminous plates, and F the glass plates fitted therein. Each one of the plates F is prepared with the well-known phosphorescent paint, and this paint is coated with a varnish which will protect the paint. On the exterior of each glass plate of the four sides I place translucent characters in any suitable manner which I desire to display, and cover them and the intermediate spaces between them with phosphorescent paint; or, if desired, instead of placing these characters on the outside of the glass, the same may be engraved on the inside of the glass plates. The white background will appear during the day when the light is on the outside of the glass or glasses.

On the inside of the glass plate or plates which have been treated with the luminous or phosphorescent paint and lettered, as described, a coating of some color is applied which will present a beautiful effect in connection with the lettering or marking on the plates. At night, after the artificial light has been turned off, the sign plate or plates will remain luminous and readable and the characters engraved on it will appear.

It will be seen from the above description that I have a device which is composed of glass plates treated with phosphorescent paint and lettered with luminous letters, and adapted to a lamp-post lantern, or any other lighted structures, which paint will store up light during the daylight and emit light during the night.

It is important, inasmuch as the plates are exposed to the weather, that the luminous paint should be thoroughly coated with gum-copal or any hard-drying transparent varnish. Such varnish is applied over the white luminous paint which is first applied to the glass.

Having thus fully described my invention, what I claim as new, and desire to secure by Letters Patent, is—

A glass plate having on it translucent characters, in combination with a coating of phosphorescent paint covering said characters, and also covering the intermediate spaces between the characters, and a protecting backing, substantially as described.

In testimony that I claim the foregoing as my own I affix my signature in presence of two witnesses.

JNO. H. LOUCH.

Witnesses:
 JEPTHA GARRARD,
 RICHARD L. AYER.